United States Patent
Haynes et al.

(10) Patent No.: US 10,189,573 B2
(45) Date of Patent: Jan. 29, 2019

(54) OFF-WING SLIDE RAFT

(71) Applicant: GOODRICH CORPORATION, Charlotte, NC (US)

(72) Inventors: Timothy C. Haynes, Prescott Valley, AZ (US); Daniel Bahena, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 74 days.

(21) Appl. No.: 15/600,520

(22) Filed: May 19, 2017

(65) Prior Publication Data
US 2018/0334257 A1    Nov. 22, 2018

(51) Int. Cl.
*B64D 25/14* (2006.01)
*B63C 9/04* (2006.01)
*B64D 25/18* (2006.01)

(52) U.S. Cl.
CPC ............ *B64D 25/14* (2013.01); *B63C 9/04* (2013.01); *B64D 25/18* (2013.01); *B63C 2009/042* (2013.01)

(58) Field of Classification Search
CPC ...... B64D 25/14; B63C 9/04; B63C 2009/042
See application file for complete search history.

(56) References Cited

U.S. PATENT DOCUMENTS

| | | | | |
|---|---|---|---|---|
| 3,606,939 A * | 9/1971 | Summer | ................ | B64D 25/14 128/DIG. 15 |
| 3,973,645 A * | 8/1976 | Dix | ........................ | B64D 25/14 182/48 |
| 4,018,321 A * | 4/1977 | Fisher | ....................... | A62B 1/20 182/48 |
| 5,360,186 A * | 11/1994 | Danielson | .............. | B64D 25/14 193/25 B |
| 5,906,340 A * | 5/1999 | Duggal | .................. | B64D 25/14 182/48 |
| 5,975,467 A | 11/1999 | O'Donnell et al. | | |
| 6,443,259 B1 * | 9/2002 | Oney | ..................... | B64D 25/14 182/18 |
| 6,814,183 B2 * | 11/2004 | Horvath | ................. | B64D 25/14 182/48 |
| 6,959,658 B2 * | 11/2005 | Gronlund | ............... | B64D 25/14 112/475.01 |
| 9,725,181 B2 * | 8/2017 | Evans | .................... | B64D 25/14 |
| 2017/0015429 A1 * | 1/2017 | Evans | .................... | B64D 25/14 |
| 2018/0079513 A1 * | 3/2018 | Volny | .................... | B64D 25/14 |

FOREIGN PATENT DOCUMENTS

| | | |
|---|---|---|
| EP | 3118118 | 1/2017 |
| GB | 1538084 | 1/1979 |

OTHER PUBLICATIONS

European Patent Office, European Search Report dated Aug. 20, 2018 in Application No. 18173231.4-1010.

* cited by examiner

*Primary Examiner* — Philip J Bonzell
(74) *Attorney, Agent, or Firm* — Snell & Wilmer, L.L.P.

(57) ABSTRACT

An inflatable evacuation device may comprise a ramp portion and a slide portion extending from the ramp portion. A releasable support strap may be coupled between the ramp portion and the slide portion. A release assembly may be coupled to the releasable support strap. The release assembly may be configured to release a tension in the releasable support strap between the ramp portion and the slide portion.

20 Claims, 6 Drawing Sheets

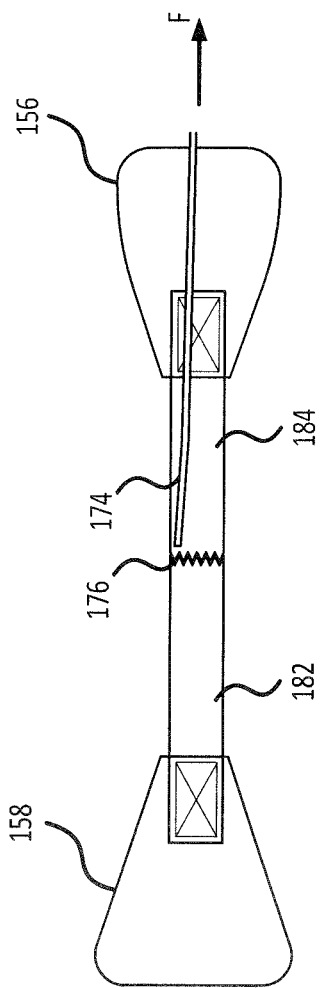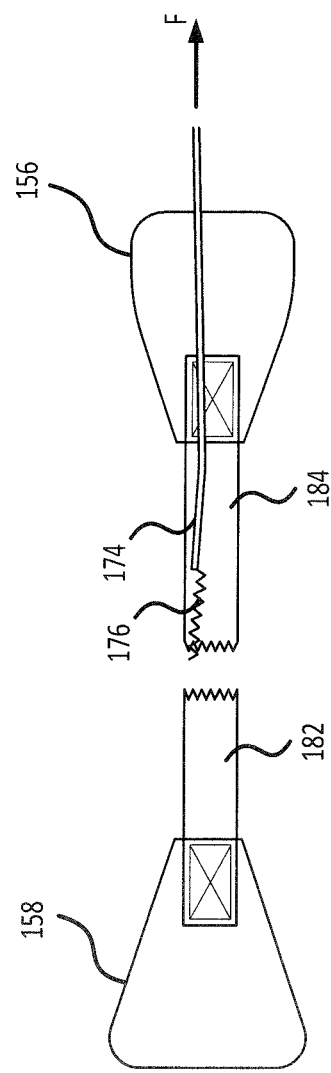

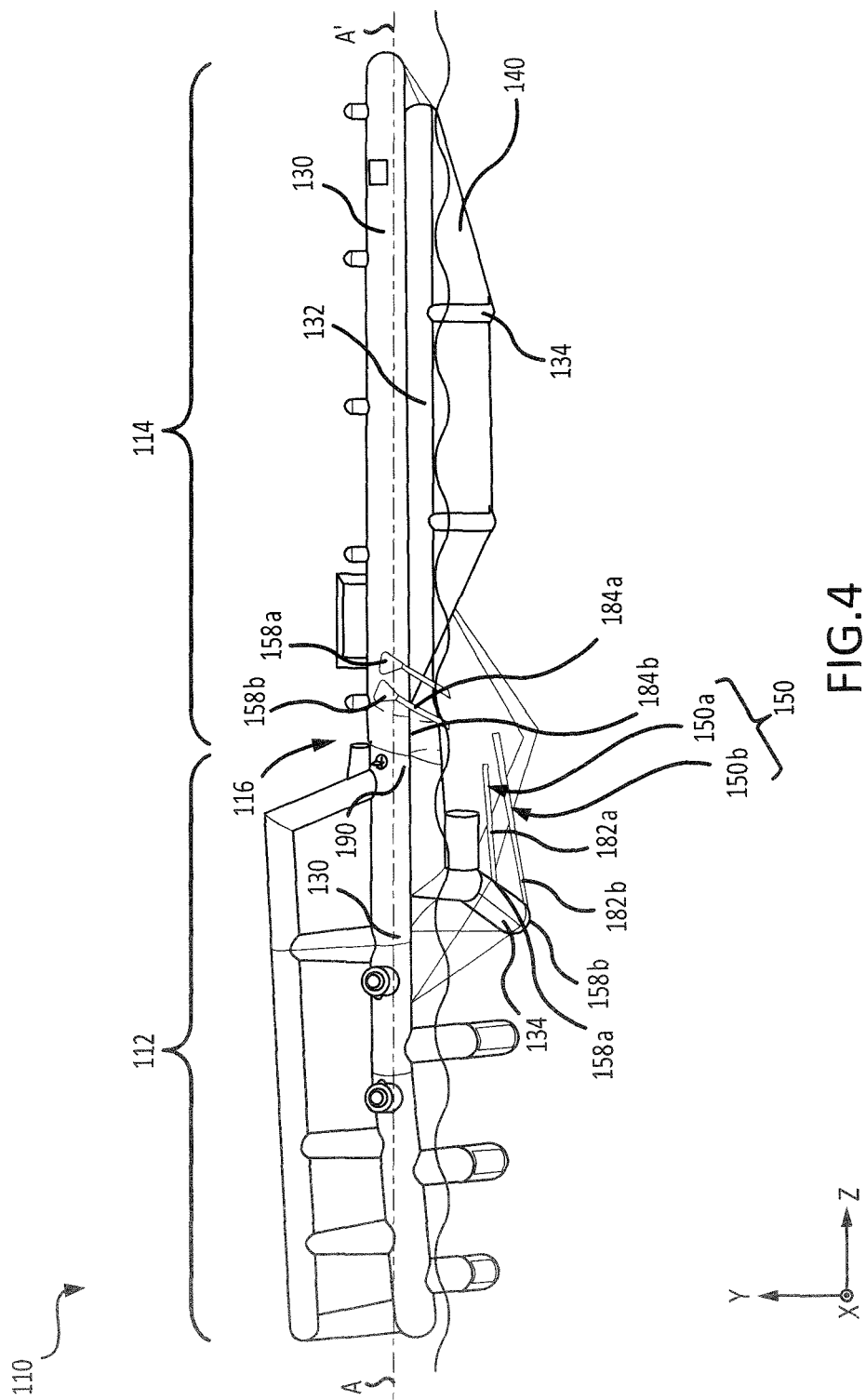

OFF-WING SLIDE RAFT

FIELD

The present disclosure relates to emergency evacuation equipment for aircraft and, more specifically, to off-wing evacuation systems.

BACKGROUND

In the event of an aircraft evacuation, evacuation assemblies, such as inflatable evacuation slides, are often deployed to safely usher passengers from the aircraft to the ground. In the event of a water landing, the inflatable evacuation slide may be employed as a life raft. Evacuation systems may deploy from the side of an aircraft fuselage, for example, or from over a wing of the aircraft, i.e., "off-wing." An off-wing evacuation system may be designed to have a ramp that leads to a sliding portion of the evacuation system. An angle between the ramp and the sliding portion of off-wing evacuation systems tends to prevent off-wing systems from being used as life rafts.

SUMMARY

An inflatable evacuation device is described herein, in accordance with various embodiments. An inflatable evacuation device may comprise a ramp portion and a slide portion extending from the ramp portion. A releasable support strap may be coupled between the ramp portion and the slide portion. A release assembly may be coupled to the releasable support strap. The release assembly may be configured to release a tension in the releasable support strap between the ramp portion and the slide portion.

In various embodiments, the tension in the releasable support may maintain an angle of slide portion between 20 degrees and 40 degrees relative to the ramp portion. The releasable support strap may comprise a first portion coupled to a second portion by a releasable connection system. The release assembly may comprise a flexible member coupled to the releasable connection system. The releasable connection system may be configured to disengage in response to a tensile force applied to the flexible member. The slide portion and the ramp portion may be coupled by a flexible joint. The slide portion and the ramp portion may be configured to be disposed in a substantially parallel position in response to the releasable support strap being decoupled. The releasable assembly may be configured to be manually engaged.

An evacuation system is also provided. The evacuation system may comprise an inflatable evacuation device configured to be deployed from an aircraft. The inflatable evacuation device may comprise a ramp portion and a slide portion. A releasable support strap may be coupled between the ramp portion and the slide portion. A tension in the releasable support strap may be configured to be removed from between the ramp portion and the slide portion.

In various embodiments, the tension in the releasable support may maintain an angle of slide portion between 20 degrees and 40 degrees relative to the ramp portion. The releasable support strap may comprise a first portion releasably coupled to a second portion by a releasable connection system. A flexible member may be coupled to the releasable connection system. The releasable connection system may comprise a thread system configured to unravel in response to a tensile force applied to the flexible member. The slide portion and the ramp portion may be coupled by a flexible joint. The slide portion and the ramp portion may be configured to be disposed in a substantially parallel position in response to the releasable support strap being decoupled. The slide portion may be configured to rotate relative to the ramp portion at the flexible joint upon the tension being removed from the releasable support strap. The inflatable evacuation device may comprise an off-wing slide raft.

A method of deploying an inflatable evacuation device may comprise the steps of inflating a ramp portion and slide portion of the inflatable evacuation device, supporting, by a releasable support strap, an angle of the slide portion relative to the ramp portion, decoupling the releasable support strap, and decreasing the angle of the slide portion relative to the ramp portion.

In various embodiments, the releasable support strap may be coupled between the slide portion and the ramp portion to form a tensioning link. The releasable support strap may comprise a first portion releasably coupled a second portion. The step of decoupling the releasable support strap may comprise unravelling a thread system to separate the first portion from the second portion. The inflatable evacuation device may comprise an off-wing slide raft.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 3A and 3B illustrate a releasable support strap for an inflatable evacuation device, in accordance with various embodiments;

FIG. 4 illustrates an off-wing inflatable evacuation device in raft mode, in accordance with various embodiments.

DETAILED DESCRIPTION

Figure 1:
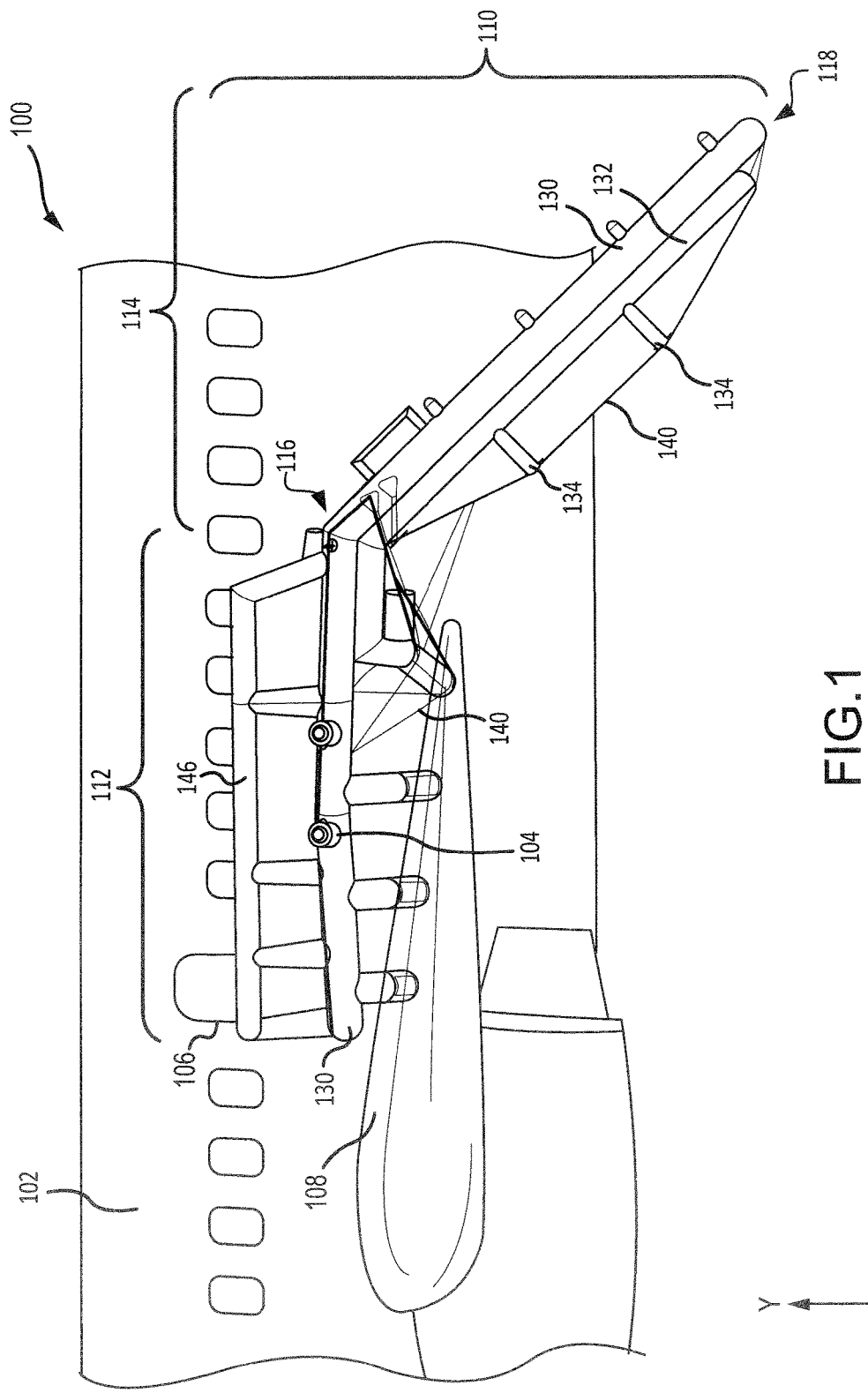
FIG. 1 illustrates a side view of an off-wing evacuation system in a deployed position, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "distal" refers to the direction outward, or generally, away from a reference component. As used herein, "proximal" refers to a direction inward, or generally, towards the reference component. With reference to an aircraft evacuation slide, "proximal" refers to a head end, and "distal" refers to a toe end.

The present disclosure relates to inflatable evacuation devices, such as slides, ramps, off-wing ramps and slides, slide rafts, life rafts, or other evacuation devices. In the event of a water landing, the disclosed emergency evacuation devices, such as off-wing ramps with slides, may also be detached from the aircraft to be used as a life raft. Off-wing inflatable evacuation devices according to the present disclosure may extend from an aircraft structure, such as over a wing, for example, to an exit surface in a fully deployed position having a ramp portion and a slide portion. During deployment, a plurality of support straps may aid in supporting the position of the ramp and slide, for example, by providing a tension link between the ramp and slide. The off-wing inflatable device may further be configured to decouple from the aircraft. One or more support straps may further comprise a release system and may be configured to de-couple a tension link from between the ramp and slide in order for the off-wing inflatable device to be used as a life raft. A release arrangement is provided to manually release one or more support straps in the event that the off-wing inflatable evacuation device is to be used as a life raft.

With reference to FIG. 1, an inflatable evacuation device in a deployed position is shown, in accordance with various embodiments. Aircraft 102 may include an evacuation system 100, which may be an off-wing evacuation system. Evacuation system 100 may include one or more evacuation devices, including one or more inflatable evacuation devices 110. Inflatable evacuation device 110 may be a slide, a slide raft, a life raft, a floatation device or other evacuation device, which may be inflatable. According to various embodiments, an inflatable evacuation device 110 may be used for emergency evacuation of an aircraft 102 and may be configured to pack within a compartment of the aircraft 102 (i.e. an aircraft door, a slide bustle, etc.). For example, inflatable evacuation device 110 may be positioned near an exit door 106 of the aircraft 102. Inflatable evacuation device 110 may be deployed from an exit door 106 of aircraft 102 located over a wing 108 of aircraft 102. In the event of an emergency, exit door 106 may be opened by a passenger or crew member of the aircraft 102. In various embodiments, for example, evacuation system 100 may deploy the inflatable evacuation device 110 in response to exit door 106 opening and, in various embodiments, evacuation system 100 may deploy in response to another action taken by a passenger or crew member such as depression of a button or actuation of a lever.

Evacuation system 100 may include an inflation source 104 coupled to inflatable evacuation device 110 and configured to inflate the inflatable evacuation device 110. Inflation source 104 may include one or more aspirators and compressed fluid sources, which may include a compressed gas tank, an inflation cylinder, pyrotechnic apparatus or other suitable inflation device. Upon deployment, inflation source 104 may deliver a pressurized fluid (such as in a gaseous state) to fill inflatable evacuation device 110 with the pressurized fluid. An aspirator may draw gas from the environment through the aspirator and may direct the environmental gas into the inflatable evacuation device 110. In response to receiving the pressurized fluid and the environmental gas, inflatable evacuation device 110 may begin to inflate. In various embodiments, inflatable evacuation device 110 may be inflated during initial deployment to a pressure, for example, between 2 pounds per square inch (psi) or 13.8 kilopascals (kPA) and 5 psi (34.5 kPA), and more specifically, to a pressure of about 3 psi (20.7 kPA), wherein "about" in this context only means +/−0.5 psi.

Inflatable evacuation device 110 may extend from an exit location at an exit door 106, and may comprise a ramp portion 112 and a slide portion 114. In an initial deployed state, shown in FIG. 1, inflatable evacuation device 110 may operate as both a ramp and a slide (i.e., "slide mode") to permit egress of passengers from aircraft 102. Ramp portion 112 may be secured to aircraft 102, such as by a girt. Ramp portion 112 may extend across a portion of wing 108 to allow evacuees to walk or traverse across a wing 108 to access the slide portion 114 of inflatable evacuation device 110. Evacuees exit the aircraft 102 onto wing 108, enter and walk across ramp portion 112, and then slide down the slide portion 114 to an exit surface, according to various embodiments. Ramp portion 112 may be generally horizontal, i.e., a walking surface may be generally in the x-z plane, and may also be slightly angled with respect to the x-z plane and conform to the surface geometry of the wing 108.

In various embodiments, slide portion 114 may extend from ramp portion 112 at wing 108 and generally slope downward (in the negative y-direction) toward an exit surface. Slide portion 114 may comprise a proximal end 116 also referred to as the head end. Proximal end 116 of slide portion 114 may be coupled to or integral with ramp portion 112. A distal end 118, also referred to as the toe end, of slide portion 114 may contact the exit surface. The exit surface may be water, a runway, uneven terrain or other surface, for example. Inflatable evacuation device 110 may be removably coupled to the fuselage of aircraft 102. Inflatable evacuation device 110 may be decoupled from aircraft 102 in response to being fully inflated or to being manually detached in order to allow passengers and/or crew members to safely float away from the aircraft 102.

In various embodiments, ramp portion 112 and slide portion 114 may comprise at least one chamber, and in various embodiments, may comprise a continuous chamber. For example, inflatable evacuation device 110 may comprise an upper chamber 130 and/or a lower chamber 132. For example, upper chamber 130 may include a plurality of tubes comprising one continuous gas fillable chamber, and lower chamber 132 may also include a plurality of tubes comprising another continuous gas fillable chamber. Each of upper chamber 130 and lower chamber 132 may be configured to inflate by receiving pressurized gas from inflation source 104. Upper chamber 130 and/or lower chamber 132 may include longitudinal tubes extending from proximal end 116 of slide portion 114 to distal end 118.

In various embodiments, ramp portion 112 and slide portion 114 may include additional support tubes 134 configured to support inflatable evacuation device 110 against buckling under heavy load while in slide mode. A plurality of support straps 140 may couple to upper chamber 130, lower chamber 132, and/or support tubes 134 and may operate as tension members to support inflatable evacuation device 110 against buckling under heavy loads.

Figure 2A:
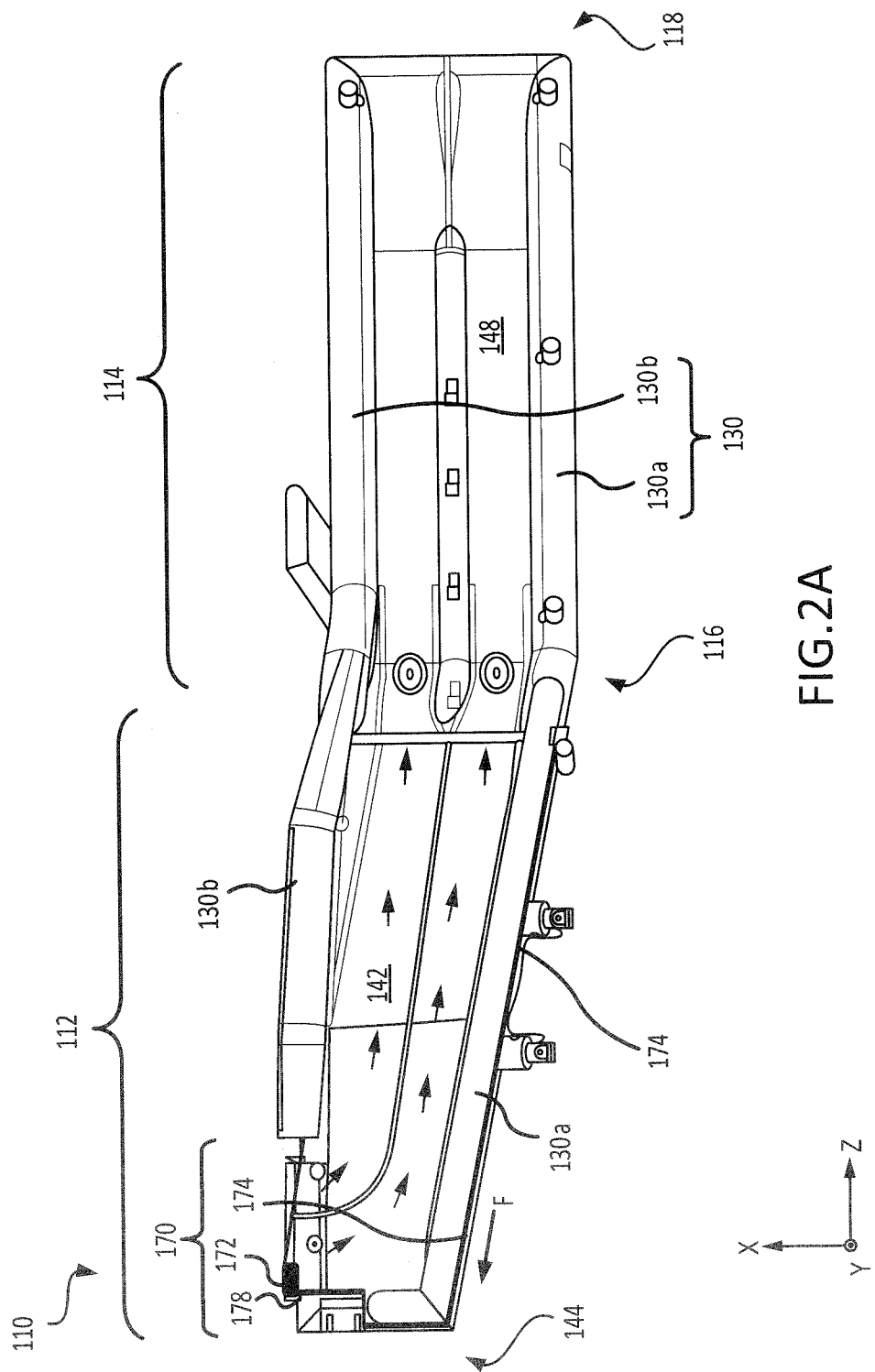
FIGS. 2A and 2B illustrate an off-wing inflatable evacuation device in slide mode, in accordance with various embodiments.

Referring now to FIG. 2A and still to FIG. 1, inflatable evacuation device 110 is shown, in accordance with various embodiments. FIG. 2A shows a top view of inflatable evacuation device 110. In various embodiments, upper chamber 130 may include longitudinal tubes 130a, 130b which may be the upper chamber 130 of at least one of ramp portion 112 or slide portion 114. Longitudinal tubes 130a, 130b may be laterally spaced apart and may support a walking surface 142 and a sliding surface 148 therebetween. Thus, walking surface 142 of ramp portion 112 may be coupled to and bordered by a proximal portion of longitudinal tubes 130a, 130b. Sliding surface 148 of ramp portion 112 coupled to and bordered by a distal portion of longitudinal tubes 130a, 130b. According to various embodiments, ramp portion 112 comprises a walking surface 142, a proximal edge 144 forming the ramp entrance, and may include rails 146. Ramp portion 112 including walking surface 142 may be supported by wing 108, for example, by resting upon the wing 108. Slide portion 114 comprises a sliding surface 148, which may be supported by upper chamber 130, lower chamber 132, support tubes 134 and/or support straps 140. Sliding surface 148 may be comprised of a flexible fabric, which may comprise a base cloth with coating, such as nylon or ballistic nylon coated in polyurethane, neoprene and/or aluminum or other suitable coating.

Figure 2B:
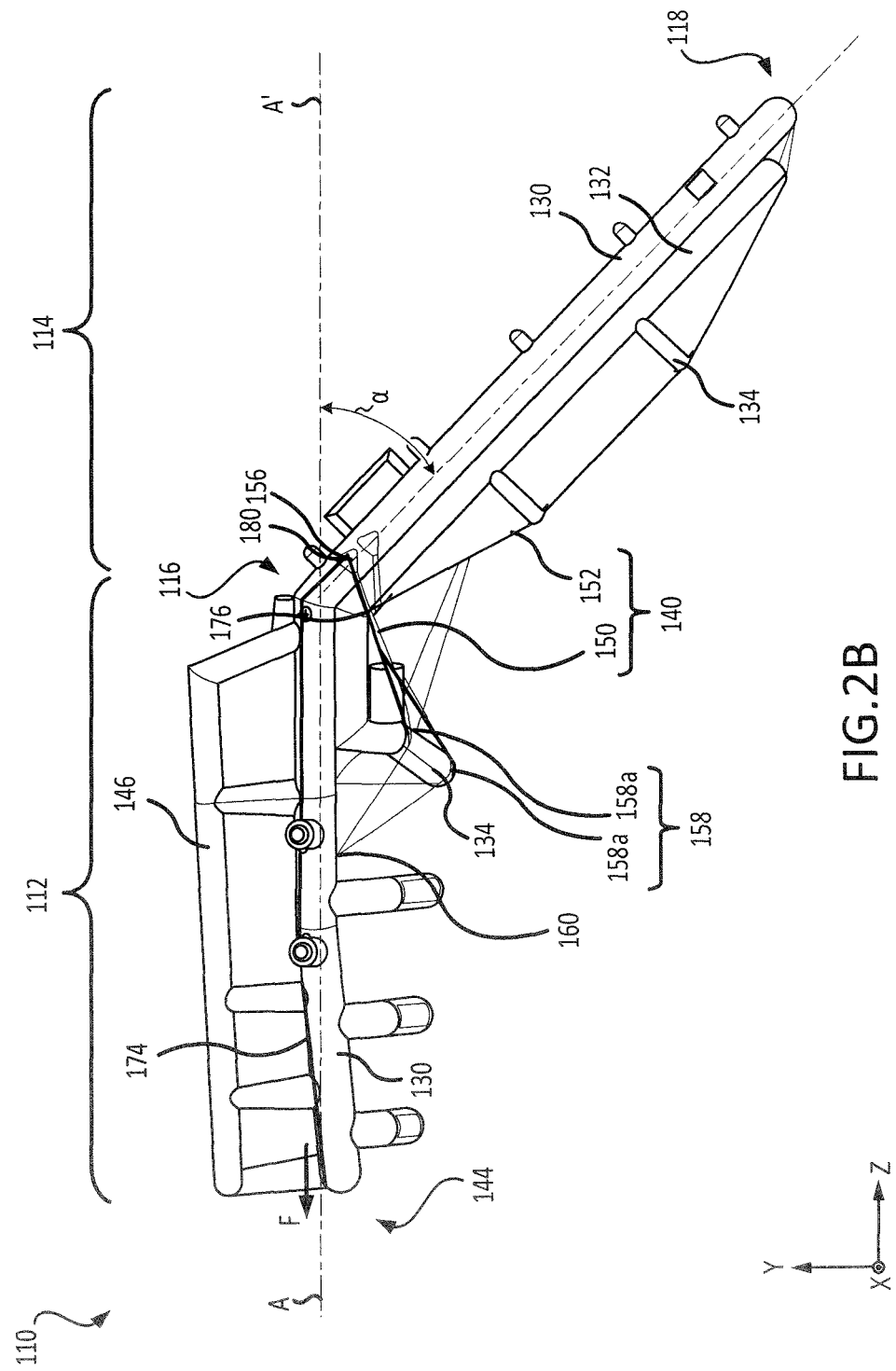

Referring to FIG. 2B, a side view of inflatable evacuation device 110 is shown, in accordance with various embodiments. In slide mode, it is desirable for inflatable evacuation device 110 to have sufficient rigidity or beam strength, when inflated, for evacuees to jump onto the slide portion 114 of inflatable evacuation device 110 and slide down. Upper chamber 130 and lower chamber 132 may each inflate to at least a minimum pressure to provide sufficient beam strength to operate as a slide. For example, a pressure of 3.0 psi (20.7 kPA) may be a minimum pressure desired within upper chamber 130 to achieve a desired beam strength. Further, support straps 140 may be coupled to inflatable evacuation device 110 to maintain the position of ramp portion 112 and slide portion 114 while in slide mode. In various embodiments, support straps 140 may include truss straps, septum straps, or other support structures coupled to one or more locations on inflatable evacuation device 110. In various embodiments, support straps 140 may comprise webbing, such as a nylon webbing, tubular webbing, rope, cord, or strap. Support straps 140 may comprise para-aramid fiber such as that sold under the mark KEVLAR®. Support straps 140 may comprise a nylon fiber or nylon fiber blend such as those sold under the mark CORDURA®. Support straps 140 may have a high tensile strength.

Support straps 140 may provide reinforcing tension and leverage for controlling undesired movement of the ramp portion 112 and/or slide portion 114, for example, while inflatable evacuation device 110 operates in slide mode. Support straps 140 may be coupled between ramp portion 112 and slide portion 114 to operate as tension links to reduce the relative motion between slide portion 114 and ramp portion 112. For illustration purposes, ramp portion 112 is shown extending generally along horizontal axis A-A', but as discussed, ramp portion 112 may be angled relative to the x-z plane. Slide portion 114 may be oriented at an angle α ("alpha") relative to ramp portion 112 (i.e., relative to horizontal axis A-A') ranging from 15 to 45 degrees, or more specifically, ranging from 20 to 40 degrees. Support straps 140 may maintain the angle α of slide portion 114 to provide a safe descent for evacuees sliding down slide portion 114.

In various embodiments, support straps 140 may include releasable support straps 150 and permanent support straps 152. Releasable support straps 150 and permanent support straps 152 may be secured to or permanently attached to anchor points on inflatable evacuation device 110 by stitching, adhesive and/or other suitable method. A releasable support strap 150 may be secured to a surface of upper chamber 130 of slide portion 114 at an anchor point 156, and to a surface of a lower chamber 132 or a support tube 134 of ramp portion 112 an anchor point 158. For purposes of illustration, FIG. 2B shows releasable support strap 150 having a single anchor point 156 on slide portion 114 and two anchor points 158a, 158b on support tube 134 coupled to ramp portion 112. Thus, releasable support strap 150 may split or branch into different branches coupled to ramp portion 112 at different anchor points 158a, 158b. In various embodiments, a plurality of releasable support straps 150 may be used and each releasable support strap 150 may have a different anchor point on ramp portion 112 and/or slide portion 114. A releasable support strap 150 may further be coupled to an anchor point 160 on upper chamber 130 at ramp portion 112.

Referring now to FIGS. 2A and 2B, inflatable evacuation device 110 may comprise a release assembly 170, which may be configured to decouple inflatable evacuation device 110 from aircraft 102 (FIG. 1) and to disengage one or more releasable support straps 150 to allow inflatable evacuation device 110 to be used as a raft (i.e., "raft mode").

Release assembly 170 may be in operable communication with releasable support straps 150. In various embodiments, release assembly 170 may comprise an actuation structure, such as a handle 172, configured to cause one or more releasable support straps 150 to decouple from between ramp portion 112 and slide portion 114. Release assembly 170 may include a flexible member 174, and a releasable connection system 176. In various embodiments, handle 172 may be located at a proximal end 178 of flexible member 174. Handle 172 may comprise a pull handle, and releasable assembly 170 may be configured to be engaged or operated manually, in accordance with various embodiments. In this regard, in response to a tensioning force being applied to handle 172, flexible member 174 may release one or more releasable support straps 150. In this manner, a single handle may be provided to release a plurality of releasable support straps 150 of inflatable evacuation device 110 to decouple the tension link of releasable support straps 150 from between ramp portion 112 and slide portion 114. Stated differently, the release assembly 170 and releasable support straps 150 may be configured to allow the use of an off-wing evacuation system as a raft, for example, in the event of a water landing.

Release assembly 170 may be coupled to releasable support straps 150 and may be configured to release or de-couple the releasable support straps 150 in response to a tensile force F in flexible member 174 exceeding a selected threshold tensile force. In various embodiments, flexible member 174 may comprise a cable. Flexible member 174 may comprise a metal material, a plastic material, and/or a fibrous material. In various embodiments, flexible member 174 may be woven or twisted. In various embodiments, flexible member 174 may comprise a steel cable having a sheath surrounding the steel cable or may comprise a plastic cable, such as a nylon cable for example. In various embodiments, flexible member 174 may comprise a tension cable surrounded by a compressive sheathing, such as a Bowden cable, wherein the tension cable transfers a tensile force F from a proximal end 178 to a distal end 180, and the compressive sleeve carries equal and opposite reaction loads from tension cable. The tensile force F in the tension cable is carried through the neutral axis of the compression sleeve. Thus, flexible member 174 may bend and move, while the relative location of the ends 178, 180 of flexible member 174 are independent from ability of handle 172 at a proximal end 178 to produce tension in flexible member 174 at distal end 180.

Referring to FIGS. 3A and 3B, a releasable support strap 150 is shown, in accordance with various embodiments. Releasable support strap 150 may comprise a first portion 182 releasably coupled to a second portion 184. First portion 182 may be releasably coupled to second portion 184 by releasable connection system 176. In various embodiments, releasable connection system 176 may comprise a thread system. In various embodiments, releasable connection system 176 may comprise speed lacing, tape, snaps, hook and loop fasteners, or other disengagable fastening system.

In various embodiments, flexible member 174 may be coupled to releasable support strap 150 at releasable connection system 176. Releasable connection system 176 may be disposed at any point along the length of releasable support strap 150 including at anchor point 156 or anchor point 158. Releasable connection system 176 may retain a first portion 182 of releasable support strap 150 to a second portion 184 of releasable support strap 150. First portion 182 of releasable support strap 150 may separate or decouple from second portion 184 of releasable support strap 150 in response to a tensile force F, imparted by flexible member 174, onto releasable connection system 176. Stated differently, releasable connection system 176 may disengage or uncouple in response to a tensile force F, imparted by flexible member 174, on releasable connection system 176. In the case of a thread system, the thread system may be stitched in a manner such that the tensile force F imparted by flexible member 174 onto the thread system may undo and/or break the stitching of the thread system. In this regard, releasable support strap 150 may be decoupled in response to flexible member 174 pulling the thread system.

FIG. 3B illustrates first portion 182 of releasable support strap 150 decoupled from second portion 184 of releasable support strap 150, with flexible member 174 having caused releasable connection system 176 to disengage. In this regard, releasable support strap 150 may be decoupled or released in response to handle 172 (FIG. 2A) being pulled, which may allow inflatable evacuation device 110 to flatten and to function as a raft (FIG. 4).

Referring to FIG. 4, inflatable evacuation device 110 in raft mode is shown, in accordance with various embodiments. Inflatable evacuation device 110 is shown with a plurality of releasable support straps 150, such as a first releasable support strap 150a and a second releasable support strap 150b, in a decoupled state. A release assembly 170 (FIGS. 2A and 2B) coupled to the releasable support straps 150 may be manually engaged to release the tension link of releasable support straps 150 from between ramp portion 112 and slide portion 114. Ramp portion 112 and slide portion 114 may be coupled by a flexible joint 190. Upon decoupling releasable support straps 150, slide portion 114 and ramp portion 112 may move or rotate relative to each other at flexible joint 190. Slide portion 114 and ramp portion 112 are configured to be disposed in a substantially parallel position in response to one or more of releasable support straps 150 being decoupled by the operation of release assembly 170.

In various embodiments, a first portion 182a detaches from a second portion 184a of first releasable support strap 150a. Similarly, a first portion 182b detaches from a second portion 184b of second releasable support strap 150b. With releasable support straps 150 decoupled, using for example release assembly 170 from FIGS. 2A, 2B, 3A and 3B, the tension in releasable support straps 150 holding slide portion 114 at an angle relative to ramp portion 112 is reduced. Slide portion 114 may rotate relative to ramp portion 112, for example, until ramp portion 112 and slide portion 114 are substantially parallel. In various embodiments, releasable support straps 150 decouple from at least one of ramp portion 112 or slide portion 114 in order to release the tension holding slide portion 114 at an angle relative to ramp portion 112. A reduced angle of slide portion 114 relative to ramp portion 112 allows inflatable evacuation device 110 to operate as a raft.

Figure 5:
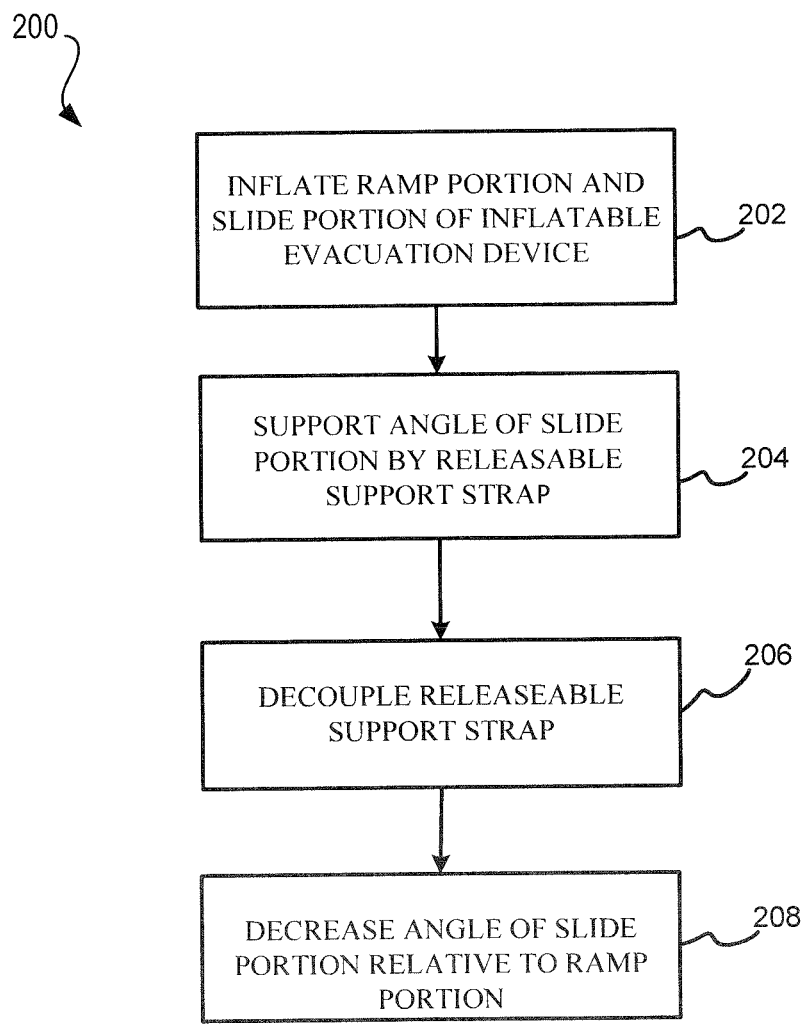
FIG. 5 illustrates a method of deploying an inflatable evacuation device, in accordance with various embodiments.

With reference to FIG. 5, a method 200 of deploying of an inflatable evacuation device is shown, in accordance with various embodiments. Method 200 may comprise the steps of inflating a ramp portion and slide portion of the inflatable evacuation device (step 202), supporting, by a releasable support strap, an angle of the slide portion relative to the ramp portion (step 204), decoupling the releasable support strap (step 206), and decreasing the angle of the slide portion relative to the ramp portion (step 208).

Step 204 may further comprise maintaining the slide portion 114 at the angle between 20 and 40 degrees relative to the ramp portion 112. The releasable support strap 150 may be coupled between the slide portion 114 and the ramp portion 112 to form a tension link.

Step 206 may further comprise separating a first portion of releasable support strap from a second portion of releasable support strap. The first portion 182 of releasable support strap 150 may be coupled to an anchor 156 on the slide portion 114. The second portion 184 of releasable support strap 150 may be coupled to an anchor 158 on the ramp portion 112. The first portion 182 and second portion 184 of releasable support strap 150 may be releasably coupled by a releasable connection system 176. The releasable connection system 176 may comprise a thread system. The thread system may unravel to separate the first portion 182 from the second portion 184 in response to a tension force F applied to the thread system by a flexible member 174.

Step 206 may further comprise detaching the inflatable evacuation device from an aircraft prior to or simultaneously with the decoupling the releasable support strap. In response to all passengers evacuating the aircraft, the inflatable evacuation device 110 may be separated from the aircraft 100 by manually pulling a release lever, such as handle 172.

Step 208 may further comprise decreasing the angle of the slide portion such that slide portion is substantially parallel with the ramp portion 112. Inflatable evacuation device 110 may be an off-wing slide raft and may be used as an evacuation slide in slide mode and/or as a life raft in raft mode.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable evacuation device, comprising:
   a ramp portion;
   a slide portion extending from the ramp portion;
   a releasable support strap coupled between the ramp portion and the slide portion; and
   a release assembly coupled to the releasable support strap, wherein the releasable support strap is configured to release tension from between the ramp portion and the slide portion such that an angle of the slide portion relative to the ramp portion changes in response to the release of tension from between the ramp portion and the slide portion, and wherein the ramp portion remains affixed to the slide portion after the release of tension from between the ramp portion and the slide portion.

2. The inflatable evacuation device of claim 1, wherein the tension in the releasable support strap maintains the angle of the slide portion between 20 degrees and 40 degrees relative to the ramp portion.

3. The inflatable evacuation device of claim 1, wherein the slide portion and the ramp portion are coupled by a flexible joint.

4. The inflatable evacuation device of claim 1, wherein the slide portion and the ramp portion are configured to be disposed in a substantially parallel position in response to the releasable support strap being decoupled.

5. The inflatable evacuation device of claim 1, wherein the release assembly is configured to be manually engaged.

6. The inflatable evacuation device of claim 1, wherein the releasable support strap comprises a first portion coupled to a second portion by a releasable connection system.

7. The inflatable evacuation device of claim 6, wherein the release assembly comprises a flexible member coupled to the releasable connection system and wherein the releasable connection system is configured to disengage in response to a tensile force applied to the flexible member.

8. An evacuation system, comprising:
   an inflatable evacuation device configured to be deployed from an aircraft, the inflatable evacuation device comprising a ramp portion and a slide portion; and
   a releasable support strap coupled between the ramp portion and the slide portion, wherein a tension in the releasable support strap is configured to be removed from between the ramp portion and the slide portion, and wherein an angle of the slide portion relative to the ramp portion is configured to change in response to the tension in the releasable support strap being removed from between the ramp portion and the slide portion, and wherein the ramp portion is configured to remain affixed to the slide portion after the tension in the releasable support strap is removed from between the ramp portion and the slide portion.

9. The evacuation system of claim 8, wherein the tension in the releasable support strap maintains the angle of the slide portion between 20 degrees and 40 degrees relative to the ramp portion.

10. The evacuation system of claim 8, wherein the slide portion and the ramp portion are coupled by a flexible joint and the slide portion is configured to rotate relative to the ramp portion at the flexible joint upon the tension being removed from the releasable support strap.

11. The evacuation system of claim 8, wherein the slide portion and the ramp portion are configured to be disposed in a substantially parallel position in response to the releasable support strap being decoupled.

12. The evacuation system of claim 8, wherein the inflatable evacuation device comprises an off-wing slide raft.

13. The evacuation system of claim 8, wherein the releasable support strap comprises a first portion releasably coupled to a second portion by a releasable connection system.

14. The evacuation system of claim 13, further including a flexible member coupled to the releasable connection system.

15. The evacuation system of claim 14, wherein the releasable connection system comprises a thread system configured to unravel in response to a tensile force applied to the flexible member.

16. A method for deploying an inflatable evacuation device, comprising:
   inflating a ramp portion and slide portion of the inflatable evacuation device;
   supporting, by a releasable support strap, an angle of the slide portion relative to the ramp portion;

decoupling the releasable support strap, wherein the slide portion is configured to remain affixed to the ramp portion after the decoupling the releasable support strap; and decreasing the angle of the slide portion relative to the ramp portion in response to the decoupling the releasable support strap.

17. The method of claim 16, wherein the releasable support strap is coupled between the slide portion and the ramp portion to form a tensioning link.

18. The method of claim 16, wherein the inflatable evacuation device comprises an off-wing slide raft.

19. The method of claim 16, wherein the releasable support strap comprises a first portion releasably coupled to a second portion.

20. The method of claim 19, wherein the decoupling the releasable support strap comprises unravelling a thread system to separate the first portion from the second portion.

\* \* \* \* \*